Patented Oct. 28, 1941

2,260,475

UNITED STATES PATENT OFFICE 2,260,475

PREPARATION OF SYNTHETIC RUBBERLIKE MATERIALS

Hans Murke, Leverkusen-Schlebusch, Germany, assignor, by mesne assignments, to Jasco, Incorporated, a corporation of Louisiana No Drawing. Application February 21, 1939, Serial No. 257,663. In Germany February 25, 1938

3 Claims. (Cl. 260—86)

The present invention relates to improvements in the preparation of synthetic rubber-like materials prepared by the conjoint polymerization of butadienes-1.3 and other polymerizable compounds.

Synthetic rubber-like materials are mostly prepared by polymerizing butadienes-1.3 in an aqueous emulsion, preferably in the presence of other polymerizable compounds such as styrene, acrylic acid nitrile, vinyl methyl ketone and the like, the resulting products representing co-polymerizates of the butadiene and the other polymerizable compound. For storing the monomeric starting materials and in order to prevent a premature polymerization thereof on standing or under the influence of heat or sun-rays, they are usually provided with a small amount of aromatic hydroxy compounds such as hydroquinone or pyrogallol which act as stabilizers. These auxiliary agents must be removed from the monomeric starting materials prior to the starting of the emulsion polymerization. To this end the said monomeric products are usually subjected to distillation shortly before converting the same into an aqueous emulsion for polymerization. On the other hand, the ready-polymerized products require the incorporation therewith of stabilizing agents in order to prevent the same from hardening and becoming insoluble in organic solvents. This phenomenon which is usually called "cyclicization" occurs on or after coagulation of the synthetic latex so that agents exerting a stabilizing action in this respect must be incorporated within the latex prior to coagulation. Stabilizers against this undesirable cyclicization are for instance phenyl-β-naphthylamine, dibenzyl-β-naphthylamine and the like.

It is the object of the present invention to develop a new process which allows one to employ the same compounds as stabilizers for the monomeric products against polymerization and for the polymeric products against cyclicization without involving the necessity of removing these products prior to the starting of the emulsion polymerization. Other objects of my invention will be apparent from the following description and claims:

I have found that such tertiary amines as are soluble in at least one of the monomeric starting materials are capable of exerting the desired result provided that the butadienes-1.3 are subjected to co-polymerization in aqueous emulsion with other polymerizable compounds. The tertiary amines may be of the aliphatic, araliphatic or aromatic series and may also contain various substituents, i. e. aliphatic radicals besides aromatic ones and the like. Tertiary amines of the character described exert a pronounced stabilizing effect upon the monomeric starting materials against polymerization, so that monomeric products of this type which are provided with such stabilizers can be stored for an indefinite period of time. Much to my surprise this stabilizing effect of the tertiary amines ceases as soon as the monomeric products are converted into an aqueous emulsion together with another polymerizable compound such as styrene and subjected to conditions promoting a co-polymerization of both compounds in the emulsion. This effect is the more surprising as the said tertiary amines exert a remarkable retarding or even an inhibiting effect upon the emulsion polymerization in case the butadienes or the other polymerizable compounds are employed alone, i. e. in the absence of a compound of the other type. On the other hand, these tertiary amines, if allowed to remain within the polymeric products, exert a simultaneous stabilizing action against cyclicization.

My new process can be applied to the polymerization of every butadiene-1.3 in emulsion in the presence of other polymerizable compounds. Suitable butadienes are for instance butadiene itself, furthermore isoprene, 2.3-dimethylbutadiene and 2-chlorobutadiene-1.3; as to the other polymerizable compounds reference is made to what is stated in the introductory paragraphs. As a matter of fact the polymerization can be performed in the presence of the commonly employed auxiliary agents such as hydrogen-peroxide, benzoyl peroxide, potassium persulfate and the like as accelerators, and also in the presence of agents exerting a regulating effect upon the course of the polymerization such as dialkyl-xanthogendisulfides. On coagulating the synthetic latex obtained the stabilizers are precipitated together with and homogenously incorporated within the synthetic rubber.

The following examples illustrate the present invention without, however, restricting it thereto the parts being by weight unless otherwise stated:

*Example 1*

75 parts of butadiene and 25 parts of styrene are emulsified in 150 parts of water, 3 parts of the sodium salt of di-isobutyl naphthalene sulfonic acid being employed as emulsifying agent. Polymerization is effected by the addition of 0.2% of ammonium persulfate. After shaking the emulsion for 145 hours at 25° 87 parts of a polymerizate are obtained which on isolating represents a dry mass of a relatively low plasticity. However, when adding 3% of dibenzyl-β-naphthylamine (calculated on the total amount of polymerizable compounds) to the emulsion prior to the starting of the polymerization and working under the same conditions the equal quantity of polymerizate is obtained which shows an excellent plasticity. When replacing the dibenzyl-β-naphthylamine by 3% of one of the following tertiary amines the following yields were obtained:

|  | Hours | Percent yield |
| --- | --- | --- |
| Dibenzylaniline | 144 | 87 |
| Tributylamine | 137 | 64 |
| Methylbenzyl aniline | 137 | 55 |
| Triphenyl amine | 140 | 68 |
| Tribenzyl amine | 140 | 96 |
| Methyl-dibenzyl amine | 144 | 85 |
| Dibutyl-β-naphthyl amine | 137 | 89 |

It follows from the figures given above that in no case the polymerization has been retarded to any material extent. On the other hand, the resulting synthetic rubber-like materials show a relatively good plasticity.

*Example 2*

Into 290 parts by volume of a 3% solution of the sodium salt of di-isobutyl naphthalene sulfonic acid in water (containing 5 parts of normal sodium hydroxide lye, 12 parts by volume of a 5% sodium pyrophosphate solution and 6 parts of a 10% ammonium persulfate solution) there are introduced 50 parts of acrylic acid nitrile (containing 6 parts of dibenzyl-β-naphthylamine) and emulsified with 150 parts of butadiene; the whole is then polymerized in a closed vessel at 30° while shaking. After a 140 hours' polymerization the yield is 71%, and 97% after a 216 hours' polymerization, the vulcanizates showing good mechanical properties even in case of the yield of 97%.

*Example 3*

A mixture of 150 parts of 2-chlorobutadiene and 50 parts of styrene (having dissolved therewith 2 parts of phenoxypropenoxide, 1.6 parts of benzoyl peroxide and 4 parts of dibenzyl-β-naphthyl amine) is emulsified while thoroughly stirring in 200 parts by volume of a 2% sodium oleate solution. On a further ½ hour's stirring polymerization occurs under self-heating, care being taken by a suitable cooling that the temperature does not surpass 30–35°. The reaction is then allowed to stand for about 12 hours and precipitated. On drying a polymerizate of an excellent plasticity is obtained in a good yield.

I claim:
1. The process which comprises subjecting a butadiene-1.3 to co-polymerization in aqueous emulsion with other polymerizable compounds capable of forming copolymerizates with a butadiene-1.3 in aqueous emulsion, the polymerization being effected in the presence of tertiary amines which are soluble in at least one of the polymerizable compounds.
2. The process as claimed in claim 1 wherein dibenzyl-β-naphthylamine is employed as tertiary amine.
3. The process as claimed in claim 1 wherein the compounds which are subjected to co-polymerization in aqueous emulsion are butadiene and styrene.

HANS MURKE.